(12) United States Patent
Ueta et al.

(10) Patent No.: US 11,148,612 B2
(45) Date of Patent: Oct. 19, 2021

(54) CAMERA FITTING STRUCTURE

(71) Applicant: Toyota Jidosha Kabushiki Kaisha, Toyota (JP)

(72) Inventors: Hideaki Ueta, Nisshin (JP); Takeshi Iwai, Nisshin (JP); Takahiro Miyado, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/739,537

(22) Filed: Jan. 10, 2020

(65) Prior Publication Data

US 2020/0262361 A1 Aug. 20, 2020

(30) Foreign Application Priority Data

Feb. 14, 2019 (JP) .............................. JP2019-024799

(51) Int. Cl.
  *B60R 11/04* (2006.01)
  *G03B 17/56* (2021.01)
  *B60R 11/00* (2006.01)
(52) U.S. Cl.
  CPC ............ *B60R 11/04* (2013.01); *G03B 17/561* (2013.01); *B60R 2011/0026* (2013.01)

(58) Field of Classification Search
  CPC ............ B60R 11/04; B60R 2011/0026; G03B 17/561
  USPC ........................................................ 348/148
  See application file for complete search history.

(56) References Cited

U.S. PATENT DOCUMENTS

| | | | |
|---|---|---|---|
| 2015/0109447 A1 | 4/2015 | Okuda | |
| 2016/0009230 A1 | 1/2016 | Miyado et al. | |
| 2018/0093620 A1 | 4/2018 | Okuda | |
| 2018/0361947 A1* | 12/2018 | Matori | ................... B60R 11/04 |
| 2018/0361949 A1 | 12/2018 | Okuda | |
| 2019/0007591 A1* | 1/2019 | Wang | ..................... H04N 7/183 |

FOREIGN PATENT DOCUMENTS

| | | |
|---|---|---|
| CN | 109094476 A | 12/2018 |
| JP | 2013-193558 A | 9/2013 |
| JP | 2016-016830 A | 2/2016 |

* cited by examiner

*Primary Examiner* — Allen C Wong
(74) *Attorney, Agent, or Firm* — Dinsmore & Shohl LLP

(57) ABSTRACT

A camera fitting structure that includes: a camera that includes an anchored portion and that detects peripheral information related to peripheral of a vehicle; and a bracket that is attached to a vehicle upper side of an inner face of a front windshield, and that includes an anchor portion to which the anchored portion is anchored by sliding the camera from a vehicle width direction first side toward a vehicle width direction second side.

5 Claims, 8 Drawing Sheets

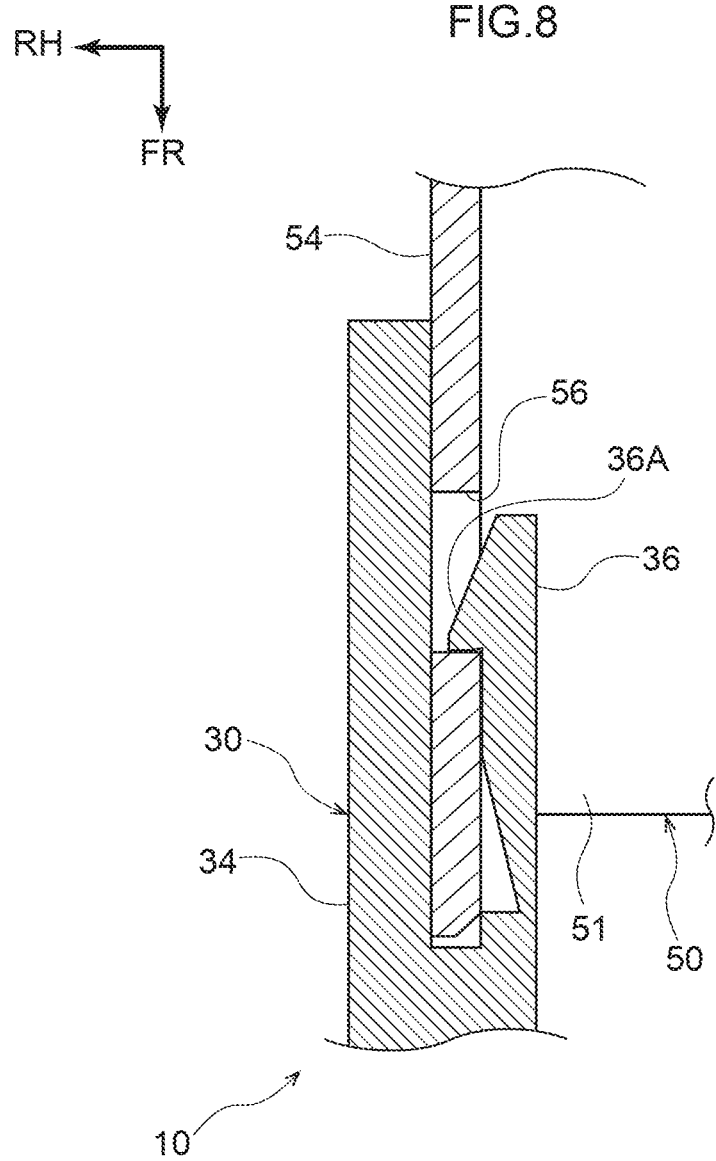

CAMERA FITTING STRUCTURE

CROSS-REFERENCE TO RELATED APPLICATION

This application is based on and claims priority under 35 USC 119 from Japanese Patent Application No. 2019-024799 filed on Feb. 14, 2019, the disclosure of which is incorporated by reference herein.

BACKGROUND

Technical Field

The present disclosure relates to a camera fitting structure.

Related Art

An attachment structure for an onboard camera exists in which a metal or resin bracket is adhered to an upper side of an inner face of a front windshield, and a camera used to detect peripheral information of a vehicle is attached to the bracket by sliding the camera from the vehicle rear side toward the vehicle front side so as to dispose the camera close to the front windshield (see, for example, Japanese Patent Application Laid-Open (JP-A) No. 2016-16830).

There is a requirement to secure the field of view of an occupant when a camera is disposed close to a front windshield. However, in structures such as the above, it is necessary to secure a long fitting space in the vehicle front-rear direction in order to fit the camera, which has repercussions with respect to securing the field of view of the occupant. There is thus still room for improvement in regard to securing the field of view of an occupant in structures in which a camera is disposed close to a front windshield.

SUMMARY

An aspect is a camera fitting structure that includes: a camera that includes an anchored portion and that detects peripheral information related to peripheral of a vehicle; and a bracket that is attached to a vehicle upper side of an inner face of a front windshield, and that includes an anchor portion to which the anchored portion is anchored by sliding the camera from a vehicle width direction first side toward a vehicle width direction second side.

BRIEF DESCRIPTION OF DRAWINGS

Exemplary embodiments will be explained in detail with reference to the following figures, wherein:

FIG. 8 is a cross-section illustrating a snap-fit structure used to attach a hood member to a bracket configuring a camera fitting structure according to an exemplary embodiment.

DETAILED DESCRIPTION

Figure 1:
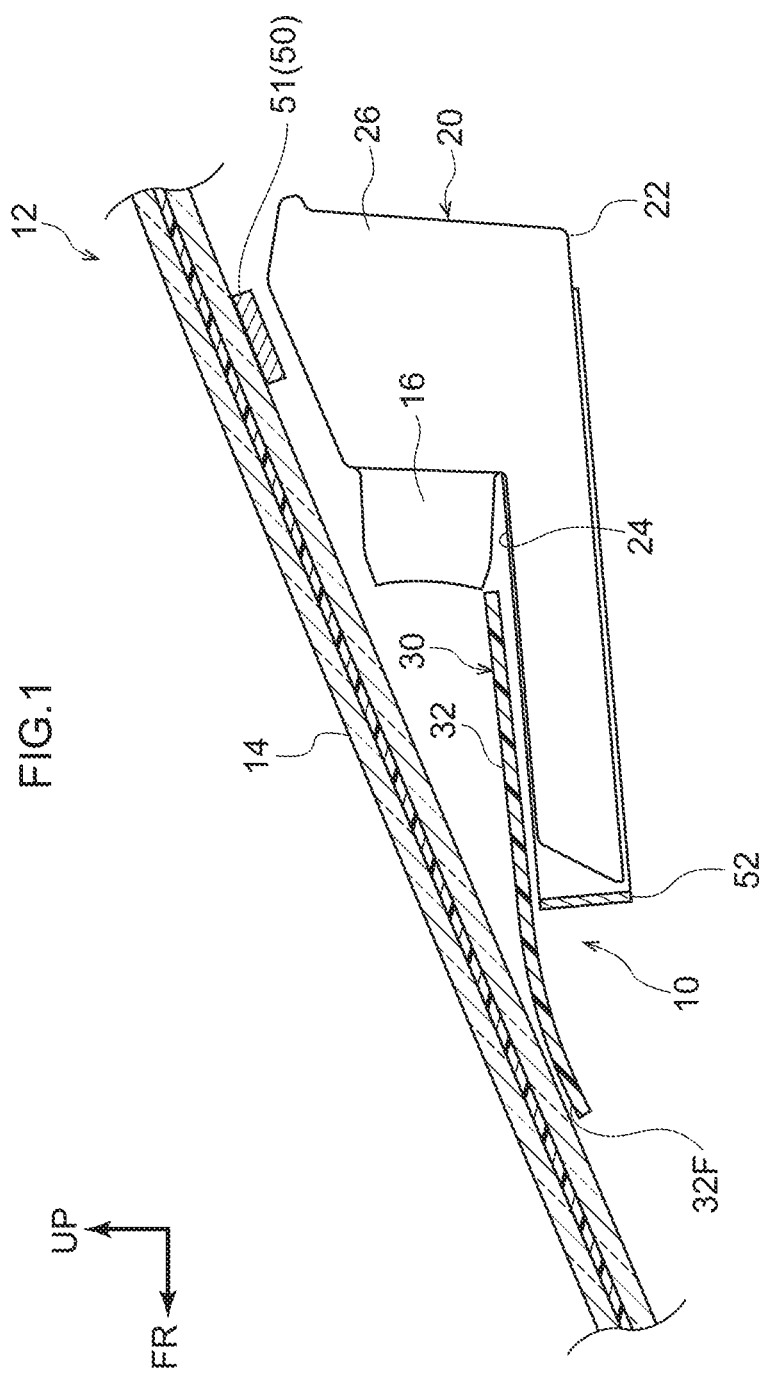
FIG. 1 is a side view illustrating a partial cross-section of a camera fitting structure according to an exemplary embodiment.

Detailed explanation follows regarding an exemplary embodiment of the present disclosure, with reference to the drawings. For ease of explanation, in the drawings the arrow UP indicates a vehicle upward direction, the arrow FR indicates a vehicle forward direction, the arrow RH indicates a vehicle right direction, and the arrow LH indicates a vehicle left direction. In the following explanation, reference simply to up, down, front, rear, left, and right directions indicates upward and downward in a vehicle vertical direction, front and rear in a vehicle front-rear direction, and left and right in a vehicle left-right direction (vehicle width direction).

As illustrated in FIG. 1, an onboard camera device 20, serving as an example of a camera configuring a camera fitting structure 10 according to the present exemplary embodiment, is fitted in a vehicle 12 so as to be provided at an inner face of a front windshield 14, at a vehicle front and upper side of an electronic interior mirror, serving as an example of a display device that displays at least images corresponding to the rear side of the vehicle 12.

Figure 2:
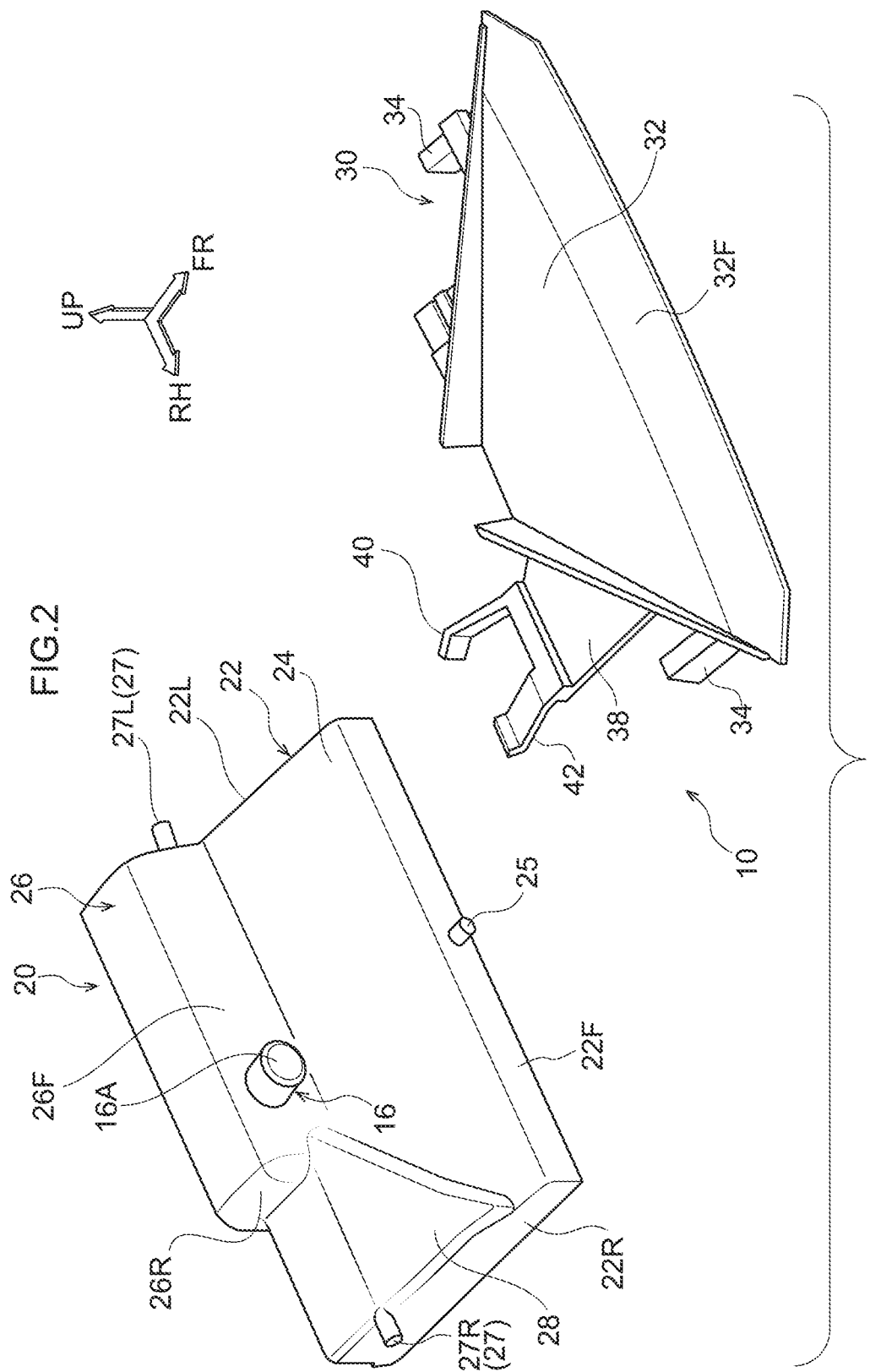
FIG. 2 is a perspective view illustrating a hood member and an onboard camera device configuring a camera fitting structure according to an exemplary embodiment, as viewed from above.

As illustrated in FIG. 2, the onboard camera device 20 includes an onboard camera 16 used to detect peripheral information relating to the vehicle 12 (such as positions, orientations, and distances) in order to assist driving (autonomous driving). The onboard camera 16 is configured within a device body 22. The device body 22 includes a flat plate shaped installation portion 24. A body 32 of an angle-of-view hood member (referred to hereafter as "hood member") 30, described later, is installed at an upper face of the installation portion 24.

The device body 22 includes a substantially rectangular block shaped raised portion 26, in which the onboard camera 16 is provided. The raised portion 26 is integrally formed at a rear side of the installation portion 24, and is formed with a taller height than the installation portion 24. A lens 16A of the onboard camera 16 projects toward the front through a circular opening formed in a front wall 26F of the raised portion 26.

The device body 22 further includes a step 28 on the right side (vehicle width direction first side) of the raised portion 26. The step 28 is formed with a taller height than the installation portion 24 and a shorter height than the raised portion 26, so as to expose a right sidewall 26R of the raised portion 26. As described later, the step 28 absorbs a height difference between the body 32 and a projecting tab 38 of the hood member 30.

Figure 3:
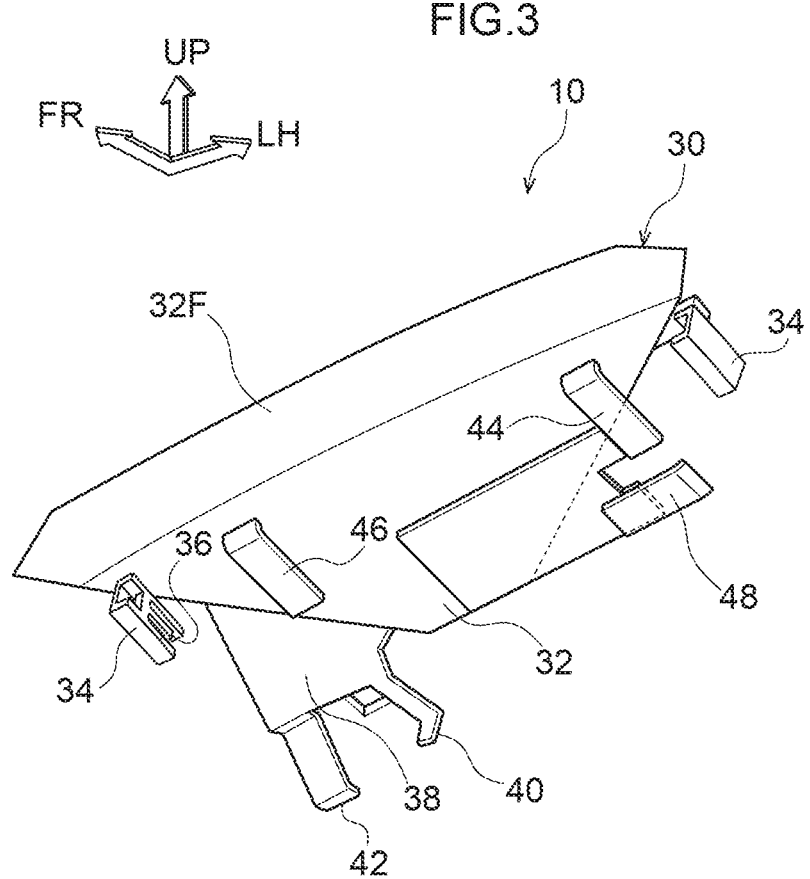
FIG. 3 is a perspective view illustrating a hood member configuring a camera fitting structure according to an exemplary embodiment, as viewed from below.

As described above, the hood member 30 that includes the body 32 is disposed on the installation portion 24 of the device body 22. The body 32 has a substantially isosceles trapezoidal shape becoming wider in the vehicle width direction on progression toward the vehicle front side in plan view (see FIG. 7). As illustrated in FIG. 2 and FIG. 3, the hood member 30 is a resin member used to suppress or prevent light that has passed through the front windshield 14 from being reflected (shining into the onboard camera 16). The body 32 is, for example, colored black.

The hood member 30 is disposed at the front and lower side of the lens 16A of the onboard camera 16. An upper face of a front end portion 32F of the body 32 of the hood member 30 is configured so as not to contact (be in a non-contact state with) the inner face of the front windshield 14 (see FIG. 1). Moreover, as illustrated in FIG. 4, the hood member 30 is attached to a bracket 50, described later.

To elaborate on this, as illustrated in FIG. 2 and FIG. 3, both left and right side portions of the hood member 30 are provided with a guide portion 34. Each of the guide portions 34 extends along the vehicle front-rear direction and has a substantially U-shaped cross-section profile opening toward the vehicle width direction inner side. As illustrated in FIG. 8, a claw 36 extending toward the rear is integrally provided at a vehicle vertical direction substantially central portion inside each of the guide portions 34. A leading end portion (rear end portion) 36A of each of the claws 36 projects toward the vehicle width direction outer side. Each of the claws 36 is capable of undergoing elastic deformation in the vehicle width direction about a point at a front end portion thereof (configuring a snap-fit structure).

Figure 4:
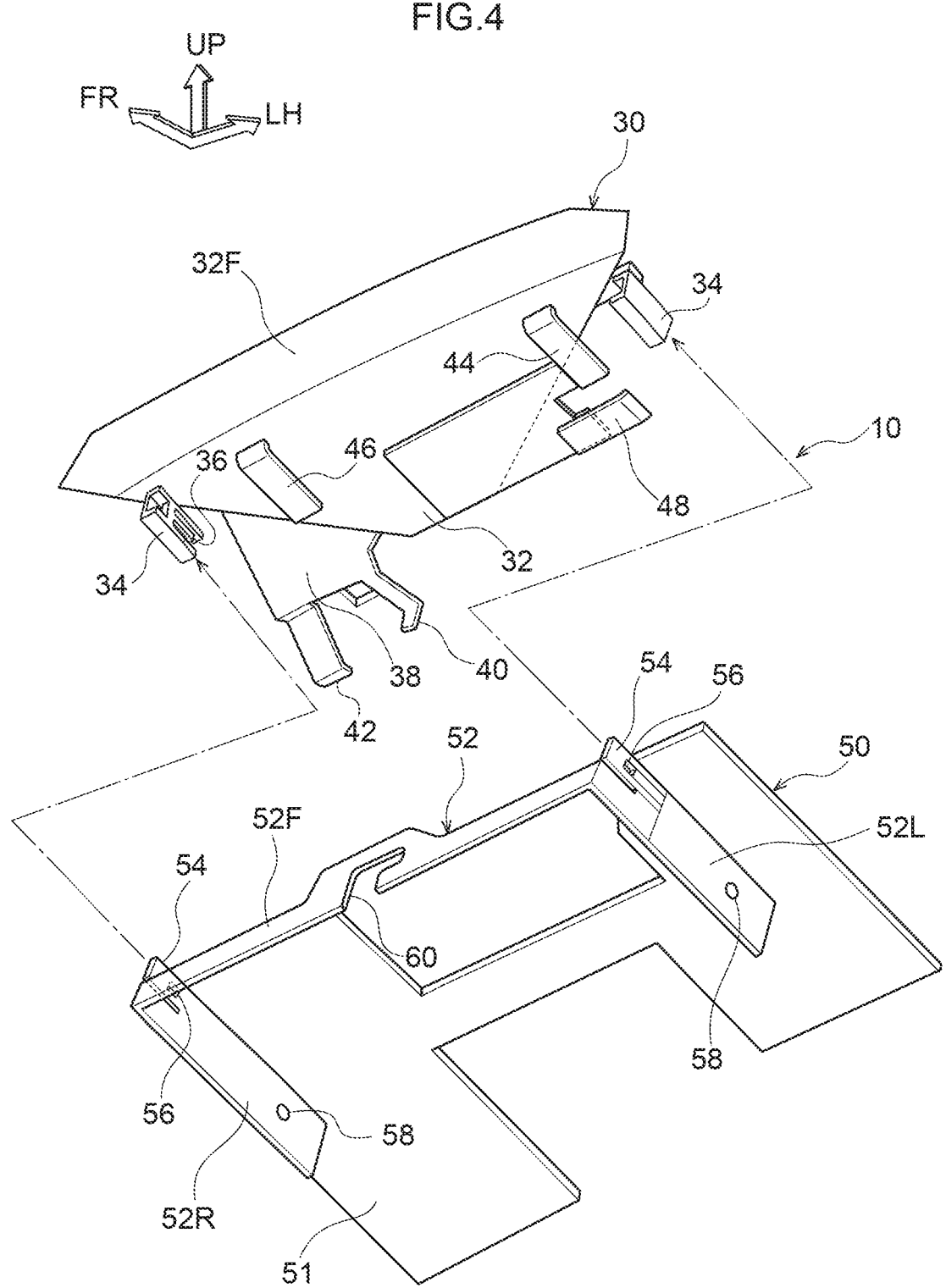
FIG. 4 is a perspective view illustrating a process to attach a hood member to a bracket configuring a camera fitting structure according to an exemplary embodiment, as viewed from below.

As illustrated in FIG. 4, rectangular flat plate shaped projecting tabs 54 that are inserted relatively into the corresponding guide portions 34 are provided on both a left and right side of a lower face of the bracket 50 (body 51) so as to project toward the vehicle front side. As illustrated in FIG. 8, a rectangular hole 56, through which a leading end portion 36A of the corresponding claw 36 is inserted from the vehicle width direction inner side, is formed through each of the projecting tabs 54. The hood member 30 is thus mounted to the bracket 50 in the following manner.

Namely, as the projecting tabs 54 are inserted relatively into the corresponding guide portions 34, the leading end portions 36A of the claws 36 are pressed toward the vehicle width direction inner side by the projecting tabs 54. Namely, the claws 36 undergo elastic deformation toward the vehicle width direction inner side. When the leading end portions 36A of the claws 36 reach the corresponding holes 56, the claws 36 recover such that the leading end portions 36A of the claws 36 are inserted into the respective holes 56. The hood member 30 is thus attached to the bracket 50.

As illustrated in FIG. 2 and FIG. 3, a rear end portion on the right side of the hood member 30 (body 32) is integrally provided with the rectangular flat plate shaped projecting tab 38 that projects toward the rear. A lower face of the projecting tab 38 is disposed at a position higher than a lower face of the body 32. The step 28 is formed to the device body 22 in order to absorb this height difference between the body 32 and the projecting tab 38.

A left end portion of a rear end portion of the projecting tab 38 is integrally formed with a sideways-facing plate spring 40, serving as a biasing member that has a length direction in the vehicle front-rear direction and that presses the raised portion 26 (right sidewall 26R) of the device body 22 toward the left side (vehicle width direction second side). A right end portion of the rear end portion of the projecting tab 38 is integrally formed with a downward-facing plate spring 42, serving as a biasing member that has a length direction in the vehicle front-rear direction and that presses the step 28 of the device body 22 toward the vehicle lower side.

Left and right end portions of a front side of a lower face of the hood member 30 (body 32) are integrally formed with a pair of downward-facing plate springs 44, 46, serving as biasing members that have a length direction in the vehicle front-rear direction and that press the installation portion 24 of the device body 22 toward the vehicle lower side. A rear end portion on the left side of the lower face of the hood member 30 (body 32) is integrally formed with a downward-facing plate spring 48, serving as a biasing member that has a length direction in the vehicle width direction and that presses the installation portion 24 of the device body 22 toward the vehicle lower side.

As illustrated in FIG. 4, the bracket 50 includes a body 51 formed from resin in a substantially H-shape in plan view. As illustrated in FIG. 1, the body 51 is attached to a vehicle width direction central portion of a vehicle upper side of the inner face of the front windshield 14 using double-sided tape and an adhesive.

To elaborate on this, the double-sided tape is adhered to the four corners of an upper face of the body 51 at the inner face of the front windshield 14, and the adhesive is used to adhere locations other than the four corners of the upper face of the body 51. Note that the hood member 30 can be attached and detached in a state in which the bracket 50 is attached to the inner face of the front windshield 14.

A mounting portion 52 with a substantially U-shape opening toward the rear as viewed from below is provided at a front side of a lower face of the bracket 50 (body 51). The projecting tabs 54 described above are integrally formed to upper sides of front portions of left and right sidewalls 52R, 52L of the mounting portion 52. A vehicle width direction spacing between an inner face of the sidewall 52R and an inner face of the sidewall 52L is formed slightly longer than the vehicle width direction length of the device body 22 of the onboard camera device 20.

Circular through holes 58, serving as anchor portions (and being slightly larger in diameter than protrusions 27, described later), are formed through rear portions of the left and right sidewalls 52R, 52L of the mounting portion 52. A guide groove 60, serving as an anchor portion formed substantially in a reclining L-shape (and having a slightly larger groove width than a protrusion 25, described later) is formed in a vehicle width direction substantially central portion of a front wall 52F of the mounting portion 52.

As illustrated in FIG. 2, the circular column shaped protrusions 27, each serving as an anchored portion, are integrally formed to left and right sidewalls 22R, 22L of the device body 22 of the onboard camera device 20, and the circular column shaped protrusion 25, also serving as an anchored portion, is integrally formed to a front wall 22F of the device body 22 of the onboard camera device 20. Regarding the projection lengths of the left and right protrusions 27, a vehicle width direction length from a leading end of a right side protrusion 27R to a leading end of a left side protrusion 27L is longer than a vehicle width direction spacing between the inner face of the sidewall 52R and the inner face of the sidewall 52L by at least the combined plate thicknesses of the sidewall 52R and the sidewall 52L.

Figure 5:
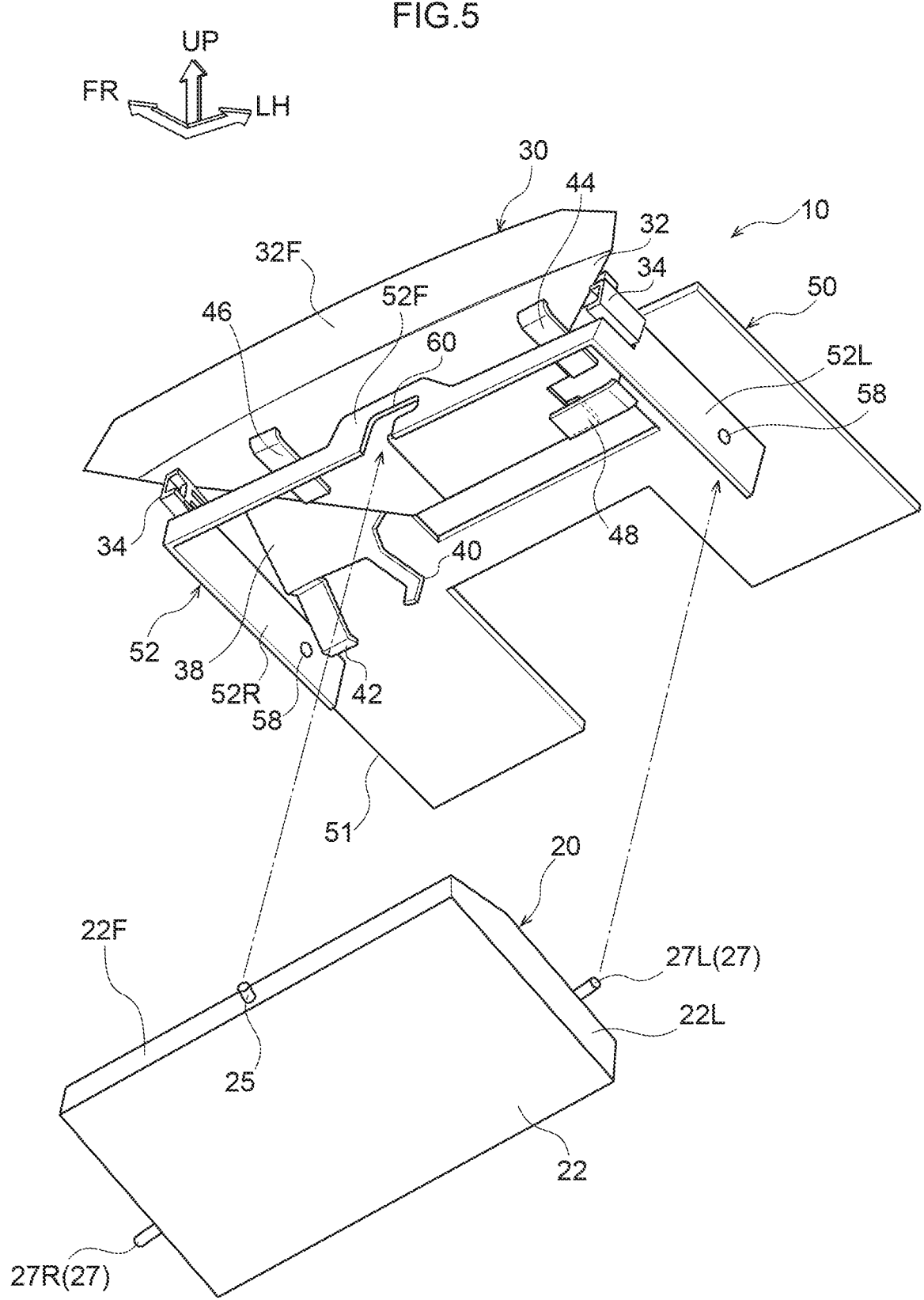
FIG. 5 is a perspective view illustrating a process to attach an onboard camera device to a bracket provided with a hood member configuring a camera fitting structure according to an exemplary embodiment, as viewed from below.

Accordingly, the onboard camera device 20 is mounted to the bracket 50 in the following manner. Namely, as illustrated in FIG. 5, the protrusion 27R formed to the right sidewall 22R of the device body 22 is inserted from the vehicle width direction inner side into the through hole 58 formed in the right sidewall 52R of the mounting portion 52 and anchored thereto, and the protrusion 25 formed on the front wall 22F of the device body 22 is inserted from the vehicle lower side into the guide groove 60 formed in the front wall 52F of the mounting portion 52.

When this is performed, the right sidewall 26R of the raised portion 26 of the device body 22 presses the sideways-facing plate spring 40 from the vehicle width direction inner side. Namely, the sideways-facing plate spring 40 is temporarily elastically deformed toward the vehicle width direction outer side against its own biasing force. Next, the device body 22 is slid toward the left side (from the vehicle width direction first side toward the vehicle width direction second side).

Figure 6:
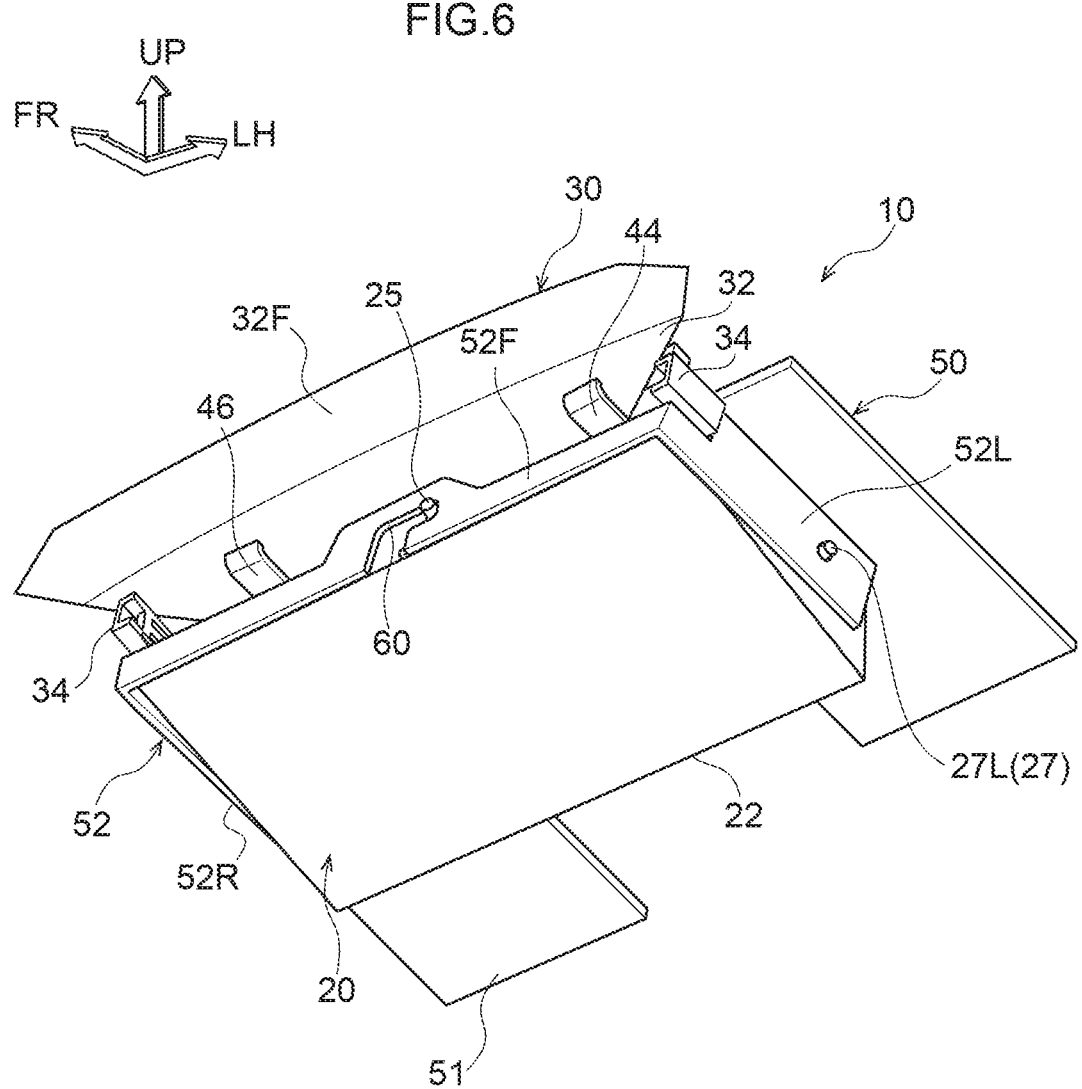
FIG. 6 is a perspective view illustrating an attached state of an onboard camera device to a bracket provided with a hood member configuring a camera fitting structure according to an exemplary embodiment, as viewed from below.

As illustrated in FIG. 6, the protrusion 27L formed to the left sidewall 22L of the device body 22 is inserted from the vehicle width direction inner side into the through hole 58 formed in the left sidewall 52L of the mounting portion 52 and anchored thereto. The protrusion 25 that has been inserted into the guide groove 60 from the vehicle lower side moves along the guide groove 60 toward the left side, and is anchored by the guide groove 60.

Figure 7:
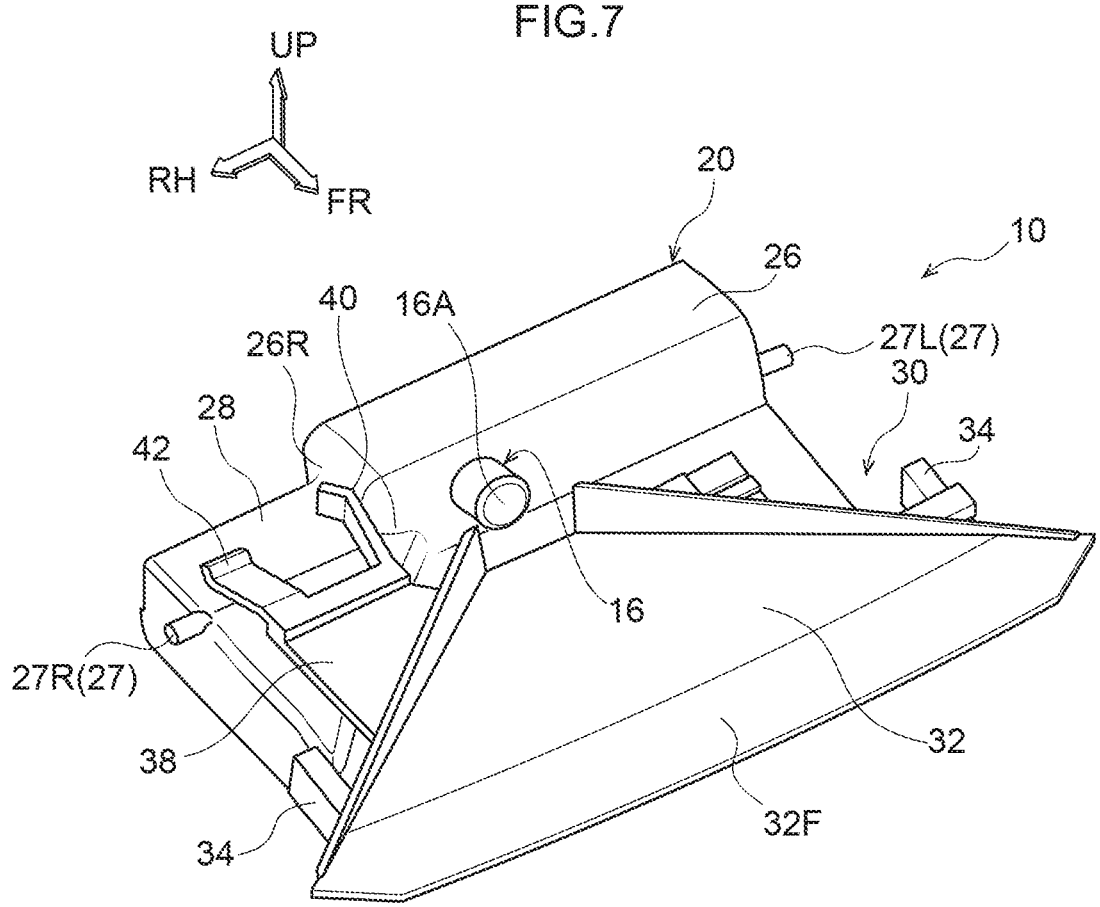
FIG. 7 is a perspective view illustrating a positional relationship between a hood member and an onboard camera device configuring a camera fitting structure according to an exemplary embodiment, as viewed from above.

When this occurs, the device body 22 is biased toward the left side (the vehicle width direction second side) by the sideways-facing plate spring 40. Namely, as illustrated in FIG. 7, the right sidewall 26R of the raised portion 26 of the device body 22 is pressed toward the left side by the sideways-facing plate spring 40. Accompanying this, the step 28 and the installation portion 24 of the device body 22 are pressed toward the vehicle lower side by the downward-facing plate springs 42, 44, 46, and 48.

Accordingly, a peripheral face of the protrusion 25 presses the front wall 52F at the periphery of the guide groove 60, and peripheral faces of the protrusions 27R, 27L press the sidewalls 52R, 52L at the periphery of the respective through holes 58, thereby fixing (locking) the device body 22 (protrusions 25, 27) such that the device body 22 does not separate from the mounting portion 52 (guide groove 60, through holes 58). Namely, the onboard camera device 20 (device body 22) is attached to the bracket 50 (mounting portion 52) in a fixed state (see FIG. 6).

In this manner, the sideways-facing plate spring 40 and the downward-facing plate springs 42, 44, 46, and 48 configure a locking mechanism to lock the protrusion 25 and the protrusions 27 such that the protrusion 25 and the protrusions 27 do not separate from the guide groove 60 and the through holes 58. Namely, this locking mechanism (the biasing members) do not allow the onboard camera device 20 to move in the vehicle front-rear direction, the vehicle vertical direction, or the vehicle width direction (vehicle left-right direction) with respect to the bracket 50.

Explanation follows regarding operation of the camera fitting structure 10 according to the present exemplary embodiment configured as described above.

As described above, the device body 22 of the onboard camera device 20 is inserted inside the mounting portion 52 against the biasing force the sideways-facing plate spring 40 and the downward-facing plate springs 42, 44, 46, and 48. The protrusion 27R is then inserted into the through hole 58 in the sidewall 52R from the vehicle width direction inner side, and the protrusion 25 is inserted into the guide groove 60 from the vehicle lower side.

Next, the device body 22 is slid from the right side (the vehicle width direction first side) toward the left side (the vehicle width direction second side). The protrusion 27L is thereby inserted into the through hole 58 in the sidewall 52L without the protrusion 27R coming out of the through hole 58 in the sidewall 52R, and the protrusion 25 moves toward the left side along the guide groove 60 so as to be anchored by the guide groove 60.

The right sidewall 26R of the raised portion 26 of the device body 22 is biased toward the left side by the sideways-facing plate spring 40, and the step 28 and the installation portion 24 of the device body 22 are biased toward the vehicle lower side by the downward-facing plate springs 42, 44, 46, and 48. Note that the downward-facing plate springs 42, 44, 46, and 48 are provided in the vicinity of the four corners of the lower face of the hood member 30. Accordingly, the downward-facing plate springs 42, 44, 46, and 48 are capable of biasing the device body 22 toward the vehicle lower side in a well-balanced manner.

Namely, the device body 22 is biased in a downward-left direction (toward the lower side and the left side) in a well-balanced manner by the sideways-facing plate spring 40 and the downward-facing plate springs 42, 44, 46, and 48. The protrusion 25 and the protrusions 27 respectively inserted into and anchored by the guide groove 60 and the through holes 58 are thus locked so as not to separate from the guide groove 60 and the through holes 58. Namely, the onboard camera device 20 is attached in a fixed state to the bracket 50 provided with the hood member 30.

The onboard camera device 20 is thus attached to the bracket 50 by sliding the onboard camera device 20 in the vehicle width direction, and is not attached to the bracket 50 by sliding in the vehicle front-rear direction. There is therefore no need to secure a long fitting space in the vehicle front-rear direction in order to fit the onboard camera device 20. This enables the fitting space required in order to dispose the onboard camera device 20 close to the front windshield 14 to be reduced. This in turn enables the field of view of an occupant to be secured.

The hood member 30 is provided with the biasing members, namely the sideways-facing plate spring 40 and the downward-facing plate springs 42, 44, 46, and 48 that configure the locking mechanism that biases the onboard camera device 20 (device body 22) in the downward-left direction to lock the protrusion 25 and the protrusions 27 such that the protrusion 25 and the protrusions 27 do not separate from the guide groove 60 and the through holes 58. Namely, the sideways-facing plate spring 40 and the downward-facing plate springs 42, 44, 46, and 48 are not directly provided to the bracket 50 that is attached to the front windshield 14.

Accordingly, even if the hood member 30 were to be damaged when removing the onboard camera device 20 from the bracket 50, for example during maintenance of the onboard camera device 20, the bracket 50 would not be damaged. Accordingly, an issue of having to replace the entire front windshield 14 in order to replace the bracket 50 can be prevented from arising.

The locking mechanism for locking the protrusion 25 and the protrusions 27 such that the protrusion 25 and the protrusions 27 do not separate from the guide groove 60 and the through holes 58 is configured by the biasing members, namely the sideways-facing plate spring 40 and the downward-facing plate springs 42, 44, 46, and 48, that bias the onboard camera device 20 (the device body 22) in the downward-left direction.

Accordingly, when attaching the onboard camera device 20, it is sufficient to attach the onboard camera device 20 by temporarily countering the biasing force of the sideways-facing plate spring 40 and the downward-facing plate springs 42, 44, 46, and 48. Likewise, when removing the onboard camera device 20, the onboard camera device 20 can be removed simply by sliding the onboard camera device 20 from the left side (the vehicle width direction second side) toward the right side (the vehicle width direction first side).

Accordingly, the locking mechanism enables the ease with which the onboard camera device 20 can be attached and detached with respect to the bracket 50 to be improved in comparison to cases in which a locking mechanism is not configured by the sideways-facing plate spring 40 and the downward-facing plate springs 42, 44, 46, and 48 (biasing members). The biasing members can also be configured with simpler structures than, for example, in a configuration employing coil springs or the like.

The hood member 30 can be attached to the bracket 50 from the vehicle front side in a single motion (to insert the projecting tabs 54 of the bracket 50 relatively into the guide portions 34 of the hood member 30). This enables the ease of an operation to attach the hood member 30 to the bracket 50 to be improved.

Moreover, since the hood member 30 can be attached to the bracket 50 from the vehicle front side, there are fewer constraints to the size of the hood member 30 than there would be in cases in which, for example, the hood member 30 is attached to a bracket by passing the hood member 30 through an opening formed in the bracket. For example, in cases in which the onboard camera 16 has a wide angle of view (range of perception), the width of the hood member 30 can be increased accordingly.

Since the biasing members configuring the locking mechanism (the sideways-facing plate spring 40 and the downward-facing plate springs 42, 44, 46, and 48) are integrally provided to the hood member 30, and the onboard camera device 20 is fixed to the bracket 50, there is no need to provide a separate fixing member in order to fix the onboard camera device 20 to the bracket 50. This enables the number of components to be reduced in comparison to cases in which a separate fixing member is provided, thereby enabling manufacturing costs to be reduced.

Although explanation has been given regarding the camera fitting structure 10 according to the present exemplary embodiment with reference to the drawings, the camera fitting structure 10 according to the present exemplary embodiment is not limited to the above explanation, and design modifications may be made within a range not departing from the spirit of the present disclosure. For example, the shape of the body 51 of the bracket 50 is not limited to the shape illustrated in the drawings.

Moreover, the direction in which the onboard camera device 20 is biased is not limited to the downward-left direction. In cases in which the device body 22 is formed with a shape having left-right symmetry to that illustrated in the drawings, the hood member 30 is also formed with a shape having left-right symmetry to that illustrated in the drawings, such that the device body 22 is biased in a downward-right direction (toward the lower side and the right side).

The biasing members configuring the locking mechanism are not limited to the sideways-facing plate spring 40 and the downward-facing plate springs 42, 44, 46, and 48, as long as the ability to attach and detach the onboard camera device 20 with respect to the bracket 50 can be secured. Moreover, the number of the downward-facing plate springs 42, 44, 46, and 48 is not limited to four, and any number thereof may be provided as long as the device body 22 can be biased toward the vehicle lower side in a well-balanced manner.

An object of the present disclosure is to obtain a camera fitting structure capable of reducing the fitting space required in order to dispose a camera configured to detect peripheral information of a vehicle close to a front windshield.

A first aspect is a camera fitting structure that includes: a camera that includes an anchored portion and that detects peripheral information related to peripheral of a vehicle; and a bracket that is attached to a vehicle upper side of an inner face of a front windshield, and that includes an anchor portion to which the anchored portion is anchored by sliding the camera from a vehicle width direction first side toward a vehicle width direction second side.

In the first aspect, the camera that is configured to detect peripheral information of the vehicle is attached to the bracket by sliding the camera from the vehicle width direction first side toward the vehicle width direction second side so as to anchor the anchored portion provided to the camera to the anchor portion provided to the bracket attached to the vehicle upper side of the inner face of the front windshield. Accordingly, there is no need to secure a long fitting space in the vehicle front-rear direction in order to fit the camera. The fitting space required in order to dispose the camera close to the front windshield is thereby reduced.

A second aspect is the camera fitting structure of the first aspect, further includes: an angle-of-view hood member that is provided at the bracket and that is disposed at a vehicle front and lower side of a lens of the camera; and a locking mechanism that is provided at the angle-of-view hood member and that locks such that the anchored portion does not separate from the anchor portion.

In the second aspect, the locking mechanism that prevents the anchored portion from separating from the anchor portion is provided to the angle-of-view hood member. Namely, the locking mechanism is not directly provided to the bracket attached to the front windshield. Accordingly, even if the angle-of-view hood member were to be damaged when removing the camera from the bracket, for example during maintenance of the camera, the bracket would not be damaged. Accordingly, an issue of having to replace the entire front windshield in order to replace the bracket can be prevented from arising.

A third aspect is the camera fitting structure of the second aspect, wherein the locking mechanism includes a biasing member that biases the camera toward the vehicle width direction second side and a vehicle lower side.

In the third aspect, the locking mechanism is configured by the biasing member that biases the camera toward the vehicle width direction second side and the vehicle lower side. Accordingly, when attaching the camera, it is sufficient to attach the camera by temporarily countering the biasing force of the biasing member. Likewise, when removing the camera, the camera can be removed simply by sliding the camera from the vehicle width direction second side toward the vehicle width direction first side. The locking mechanism thus improves the ease with which the camera can be attached and detached with respect to the bracket in comparison to cases in which a locking mechanism is not configured by the biasing member.

A fourth aspect is the camera fitting structure of the third aspect, wherein the biasing member is a plate spring.

In the fourth aspect, the biasing member is configured by a plate spring. The biasing member can accordingly be configured with a simpler structure than, for example, in a configuration employing a coil spring or the like.

The present disclosure is capable of reducing the fitting space required in order to dispose a camera configured to detect vehicle peripheral information close to a front windshield.

The invention claimed is:

1. A camera fitting structure comprising:
   a camera that includes an anchored portion and that detects peripheral information related to peripheral of a vehicle; and
   a bracket that is attached to a vehicle upper side of an inner face of a front windshield, and that includes an anchor portion to which the anchored portion is anchored by sliding the camera from a vehicle width direction first side toward a vehicle width direction second side.

2. The camera fitting structure of claim 1, further comprising:
   an angle-of-view hood member that is provided at the bracket and that is disposed at a vehicle front and lower side of a lens of the camera; and
   a locking mechanism that is provided at the angle-of-view hood member and that locks such that the anchored portion does not separate from the anchor portion.

3. The camera fitting structure of claim 2, wherein the locking mechanism includes a biasing member that biases the camera toward the vehicle width direction second side and a vehicle lower side.

4. The camera fitting structure of claim 3, wherein the biasing member is a plate spring.

5. The camera fitting structure of claim 1, wherein the bracket includes a projecting tab that is inserted into a guide portion of the angle-of-view hood member from a vehicle front side.

* * * * *